Sept. 28, 1926.
C. WURTENBERG
1,601,549
MACHINE FOR ASSEMBLING PARTS OF RUBBER ARTICLES
Filed March 13, 1926    2 Sheets-Sheet 1
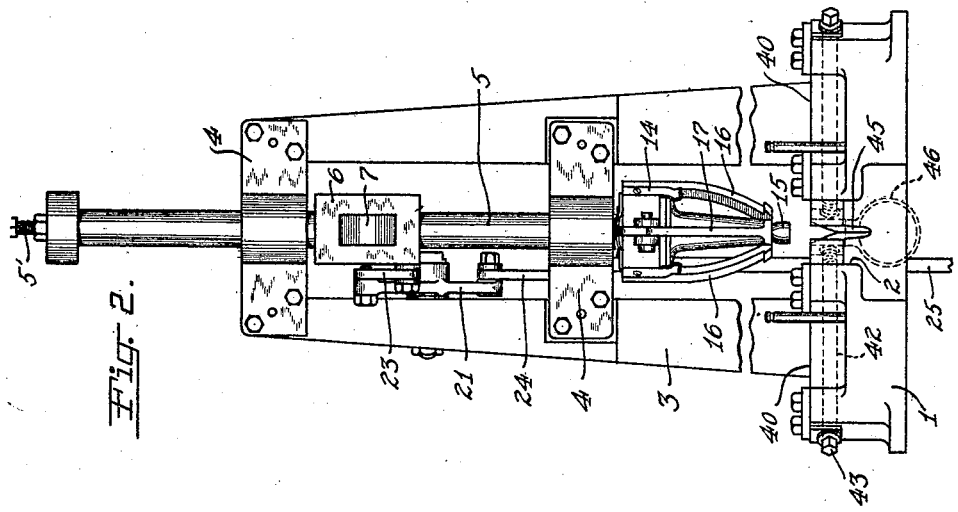
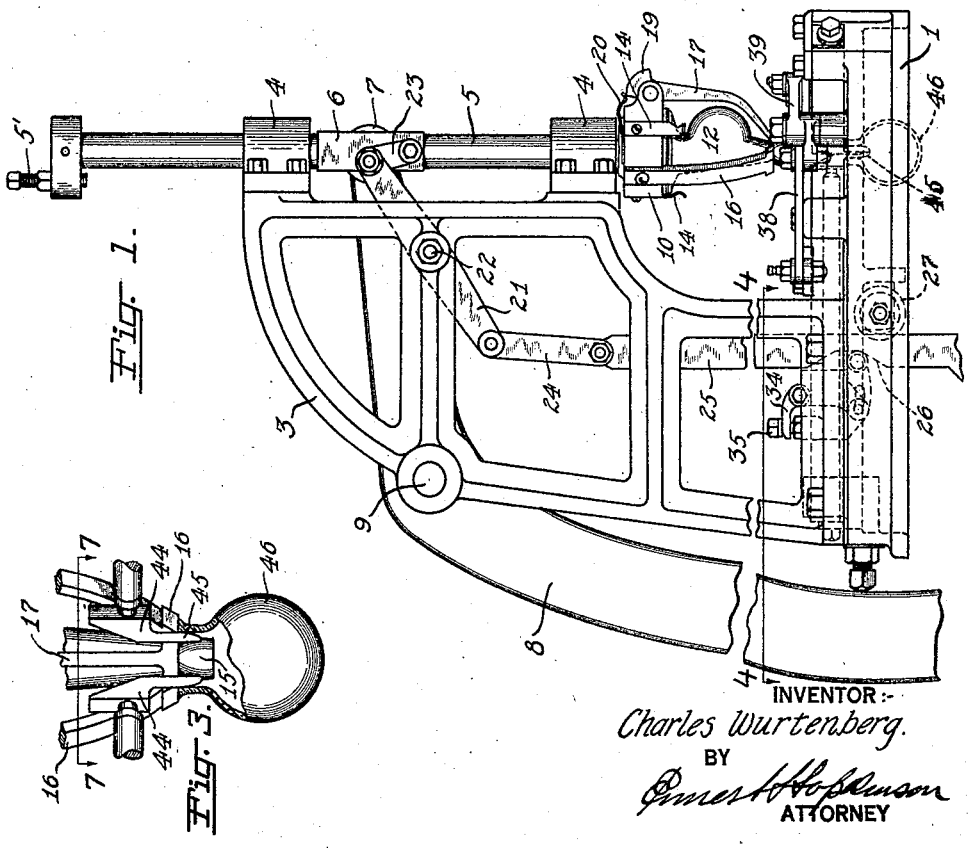
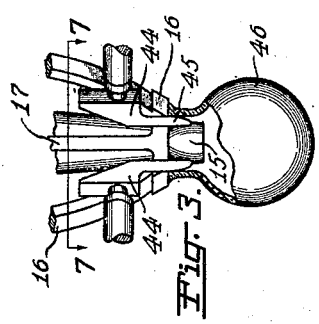
INVENTOR:-
Charles Wurtenberg.
BY
Ernest H. Hopkinson
ATTORNEY Sept. 28, 1926.    1,601,549
C. WURTENBERG
MACHINE FOR ASSEMBLING PARTS OF RUBBER ARTICLES
Filed March 13, 1926    2 Sheets-Sheet 2
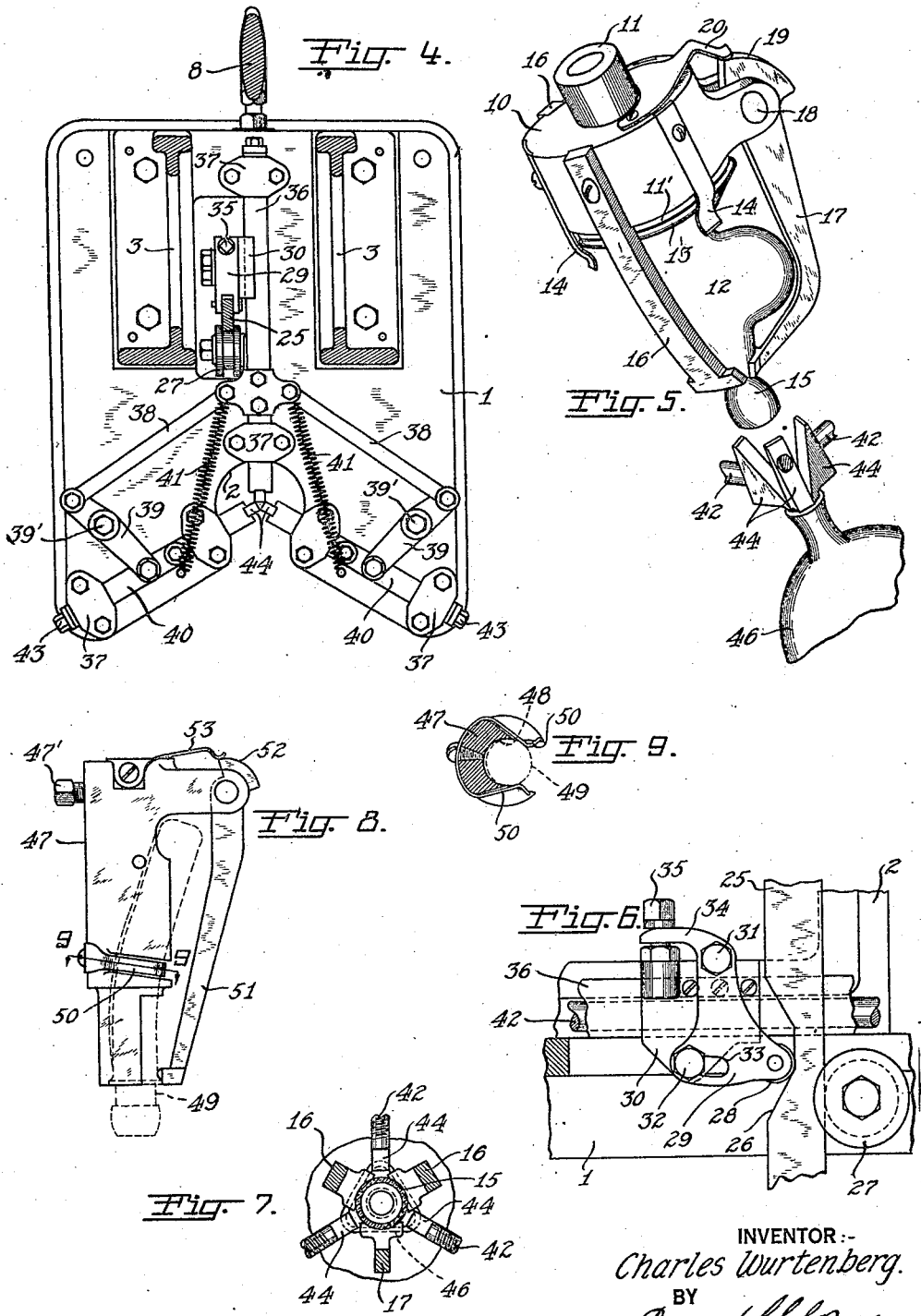
INVENTOR:-
Charles Wurtenberg.
BY
Ernest H. Johanson
ATTORNEY Patented Sept. 28, 1926.

1,601,549

UNITED STATES PATENT OFFICE.

CHARLES WURTENBERG, OF UNION CITY, CONNECTICUT, ASSIGNOR TO L. CANDEE & CO., OF NEW HAVEN, CONNECTICUT, A CORPORATION OF CONNECTICUT.

MACHINE FOR ASSEMBLING PARTS OF RUBBER ARTICLES.

Application filed March 13, 1926. Serial No. 94,563.

This invention relates to a machine for assembling parts of rubber articles, more particularly to a machine for telescopically assembling such parts.

In the assembling of the parts of some rubber articles more especially druggists' sundries, it is frequently necessary to unite parts by a telescopic joint, for instance when uniting a valve to an atomizer bulb, a tube or nipple to a bulb, two bulbs, and many other instances familiar to those in the trade. Prior to my invention, it has been customary to assemble such parts by hand, the operator manually stretching the open end of one part and then inserting the other part therein. This operation requires considerable manual labor, care and skill on the part of the operator, and there is considerable waste and damage by reason of over-stretching and tearing of the parts.

An object of my invention is to provide a simple, rapid and effective machine for assembling the parts of rubber articles. Another object is to provide a machine for telescopically assembling the parts of a rubber article without loss or damage by reason of over-stretching of the parts. Still another object is to provide a machine which is readily adaptable for the assembling of parts of different sizes and shapes. Other objects will appear from the detailed description.

Without intention to limit the invention otherwise than as is required by the prior art, it consists broadly in means for holding one of the parts to be assembled, means for holding the other part in alignment therewith, means for relatively moving the two holding means to telescope the parts, and means for stretching one of the parts prior to the telescoping of the other therein.

For a detailed disclosure of the nature and objects of the invention reference is had to the accompanying specification and drawings, in which latter:—

Figure 1 is a side elevation of the machine,
Figure 2 is a front elevation,
Figure 3 is a broken away detail,
Figure 4 is a section on the line 4—4 of Figure 1,
Figure 5 is an enlarged detail perspective,
Figure 6 is a broken away detail on an enlarged scale,
Figure 7 is a section on the line 7—7 of Figure 3,
Figure 8 is a detail of a modified form of holder, and
Figure 9 is a section on the line 9—9 of Figure 8.

Referring to the drawings, the numeral 1 designates the base or workbed of the machine, which may be mounted on legs or in any other suitable manner. At its forward end, the workbed is provided with an opening 2 for a purpose to be later described. Extending upwardly from the workbed are two spaced frames 3, united by the cross pieces 4, which latter also act as bearings for a plunger 5. The plunger is provided at its upper end with an adjustable stop screw 5' adapted to contact with the upper cross piece 4 and limit the reciprocating movement of the plunger. Between the bearings 4 the plunger is provided with an enlarged portion 6, and rotatably and slidably disposed in an opening in the enlarged portion 6 is the rounded end 7 of an actuating lever 8, the lever being pivoted to the frame 3 at 9. This lever may be operated by a foot treadle or in any other suitable manner. Removably attached to the lower end of the plunger 5 is a holder 10 for one of the parts to be connected, the holder having a socket 11 (Figure 5) on one side for attachment to the plunger 5. On the other side, it is provided with a projection 11' for engagement with the object to be held. In the present instance the holder is shown as adapted for holding a breast pump 12, the flange 13 of the latter being disposed in engagement with the projection 11'. In order to hold the flange in position spring fingers 14 are provided, in the present instance three being shown. The pump is formed at its opposite end with a valve nipple 15 which is to be attached to a compression bulb, and the holder is provided with fixed fingers 16 adapted to engage the pump in rear of the nipple. A movable finger 17 also engages the pump in the same plane as the fingers 16, said finger being pivoted to the holder body at 18 and at its upper end being provided with a cam surface 19 upon which rests a spring 20. In the present instance two fixed fingers 16 are shown, and they and the movable finger 17 are preferably equidistantly spaced around the pump in rear of the nipple. It will be seen that by withdrawing the movable finger 17, the pump 12 can be properly positioned in the holder, and the movable finger 17 then moved down into the position shown in the Figure 5.

A lever 21 is pivotally mounted at 22 on the frame 3, and one end of this lever is connected by a link 23 to the plunger 5, while the opposite end of the lever is connected by a link 24 to a cam slide 25 provided with the cam surface 26 (Figures 1 and 6). The slide 25 is guided on one side by a roller 27 and a cam roller 28 is disposed on the opposite side to engage the cam 26. The cam roller is mounted in a plate 29 which is secured to a plate 30 by the screws 31 and 32, the screw 32 passing through a curved slot 33 in the plate 29. The upper end of the plate 29 is provided with a forked arm 34 through which passes an adjusting screw 35 threaded into a boss on the plate 30. By loosening the screws 31 and 32 and then operating the adjusting screw 35, the plate 29 may be moved about the screw 31 as a pivot to vary the throw imparted to the cam roller 28 by the slide 25. The plate 30 is secured to a slide 36 which is mounted in bearings 37 secured to the workbed 1, as shown most clearly in Figure 4. Attached to the slide 36 at each side are links 38 which are also connected to the ends of levers 39 pivoted to the workbed at 39'. These levers are in turn connected to slides 40 mounted in bearings 37 on the workbed, these latter slides being similar to the slide 36. It will be seen from Figure 4 that the slides 36 and 40 are movable radially from a common center, and the slides are held at their inner positions by coil springs 41 attached to the workbed and to the slide 36. Extending through each of the slides 36 and 40 is a draw rod 42 (see Figure 6), each of these rods being provided at its outer end with a nut 43 and being threaded at its inner end to a block 44. These blocks, which are most clearly shown in Figures 3 and 5, are provided at their lower ends with tapering holding and stretching fingers 45. The fingers 45 extend downwardly through the opening 2 in the workbed and are adapted to be inserted in the open neck of the compression bulb 46 as shown in Figures 1, 2 and 5, or any other part which is being assembled in the machine.

It is obvious that by changing the form and size of the holder 10 or of the fingers 45, or of both, the parts of various articles may be held for assembling. In Figures 8 and 9 a modified form of holder is shown for engaging a tubular part to be telescoped into a desired other part. In said figures the holder is designated by the numeral 47 and is provided with a set screw 47' for securing it to the plunger 5. An elongated recess 48 is provided in the holder for the reception of a tubular part 49 which is to be assembled, and said part is held in position by the spring clips 50. Adjacent its lower end, the tubular part 49 is also held by a spring pressed finger 51 pivotally mounted in the holder body 47 and provided at its upper end with a cam surface 52 engaged by a spring 53 in a manner similar to the spring pressed finger 17 of the holder 10.

In operation the spring pressed finger 17 is swung outwardly, the pump 12 is inserted in the holder and its flange 13 disposed against the projection 11', being held in such position by the springs 14, and the spring pressed finger 17 is then swung down again to engage the pump at the rear end of the valve nipple 15 and in spaced relation to the fixed fingers 16. The neck of the compression bulb 46 is then pushed up over the stretching fingers 45, the latter being at this time held in their inner position by the springs 41 as shown in Figures 1, 2, 4 and 5. The lever 8 is then operated to depress the plunger 5 with its holder 10 carrying the pump 12. During the downward movement of the plunger 5, the cam slide 25 is also operated, and this in turn acting upon the cam roller 28 causes the slides 36 and 40 to be moved radially outward, thereby separating the stretching fingers 45 and stretching the neck of the bulb 46 to the position shown in Figure 7 in dotted lines. The fingers 45 have reached their extreme outer position before the nipple 15 reaches the neck of the bulb 46, and in the further downward movement of the plunger 5 the nipple 15 is telescoped within the neck of the bulb 46. It will be noted that the fingers 16 and 17 engage the pump 12 at a distance in rear of the end of the nipple 15 approximately equal to the distance which it is desired to telescope the nipple within the neck of the bulb 46, and when the nipple has been telescoped within the bulb to this distance the fingers 16 and 17 engage the bulb neck as shown in Figure 3, and as the plunger 5 continues its downward movement, the bulb 46 is pushed off of the stretching fingers 45 and permitted to contract around the nipple 15. It will be seen from Figure 7 that the fingers 16 and 17 are located so as to pass between the fingers 45 when the latter are in their outermost position.

If it is desired for instance, to assemble a tubular part, such as a rubber tube, and a bulb, the holder 10 is removed and the holder 47 substituted. After placing the tube 49 in the holder, the operation of assembling the parts is substantially as before described. It will be seen that by the use of various types of holders or stretching fingers 45 or both, the machine can be used for assembling a wide variety of parts. The number and arrangement of the fingers 16, 17 and 45 can also be varied. By adjustment of the position of the cam roller 28, the throw of the slides 36 and 40 can be regulated to vary the movement of fingers 45 in accordance with the sizes of the parts being assembled. The relative axial position of the fingers 16 and 17 may also be varied to change the length of the telescoped joint.

It will be seen that by the use of my machine a large variety of rubber parts which are to be telescopically connected may be easily joined, that the outer one of the parts to be telescoped may be uniformly and exactly stretched to just a degree sufficient to permit the telescoping of the parts, and the inner part inserted to exactly the required distance. By reason of this exact procedure, breakage or other damage to goods through overstretching the parts is entirely avoided. In addition, the operation can be performed with a minimum of manual labor and with much greater rapidity than previously. The machine is simple, cheap and not liable to get out of order. While specific examples of its use have been given, it is obvious that it is capable of many other uses wherever it is necessary to telescope one part within another elastic part.

With the above detailed disclosure it is obvious that numerous modifications will suggest themselves to those skilled in the art, and it is not desired to limit the claims otherwise than as required by the prior art.

Having thus described my invention what I claim and desire to protect by Letters Patent is:—

1. An apparatus for telescopically assembling parts of rubber articles which comprises spaced means for holding the parts and for stretching one of them, and means for relatively moving the parts to telescope them, the holding means including means for thereafter moving the parts in unison to free them from the stretching means.

2. An apparatus for telescopically assembling parts of rubber articles which comprises separate means for holding the parts, means for relatively moving them to telescope the parts, and means actuated thereby for stretching one of the parts prior to telescoping them.

3. An apparatus for telescopically assembling parts of rubber articles which comprises separate means for holding the parts, means for relatively moving them to telescope the parts, means actuated thereby for stretching one of the parts prior to telescoping them, and means for varying the stretching action.

4. An apparatus for telescopically assembling parts of rubber articles which comprises means for externally holding one part, means for internally holding the other part, means for relatively moving the holding means to telescope the parts, and means actuated by said last means for moving the internally holding means to stretch its part prior to the telescoping of the other part therein.

5. An apparatus for telescopically assembling parts of rubber articles which comprises means for externally holding one part, means for internally holding the other part, means for relatively moving the holding means to telescope the parts, means actuated by said last means for moving the internally holding means to stretch its part prior to the telescoping of the other part therein, and means for varying the stretching action.

6. An apparatus for telescopically assembling parts of rubber articles which comprises means for externally holding one part, means for internally holdng the other part, means for relatively moving the holding means to telescope the parts, means actuated by said last means for moving the internally holding means to stretch its part prior to the telescoping of the other part therein, and means included in the externally holding means for releasing the internally holding means from its part after telescoping of the parts.

7. An apparatus for telescopically assembling parts of rubber articles which comprises a plunger, part holding means carried thereby, a series of part holding and stretching fingers movable outwardly from a common center which is in alignment with the axis of said plunger, means for moving said plunger and holder toward said stretching fingers, and means connected to the plunger for actuating said stretching fingers.

8. An apparatus for telescopically assembling parts of rubber articles whch comprises a plunger, a part holder attached thereto, fingers carried by said holder for gripping said part adjacent the portion to be telescoped, a series of fingers adapted to receive the telescoping part, said fingers being movable outwardly from a common center in alignment with the axis of said plunger, and means connected to said plunger for actuating said stretching fingers.

9. An apparatus for telescopically assembling parts of rubber articles which comprises a plunger, a holder carried thereby and provided with fingers for gripping a part adjacent the portion to be telescoped, a series of part holding and stretching fingers movable radially outward from a common center which is in alignment with the axis of said plunger, means connected to said plunger for actuating said stretching fingers, and means for varying the extent of movement of said stretching fingers.

10. An apparatus for telescopically assembling parts of rubber articles which comprises a holder for a part to be telescoped, a series of holding and stretching fingers for a telescoping part, means for relatively moving the holder and stretching fingers to stretch the second part and insert the first therein, and means thereafter operable to remove the telescoping part from the stretching fingers.

Signed at New Haven, county of New Haven, State of Connecticut, this 5 day of March 1926.

CHARLES WURTENBERG.